US005510987A

United States Patent [19]

Song

[11] Patent Number: 5,510,987

[45] Date of Patent: Apr. 23, 1996

[54] SHOCK PREVENTION APPARATUS FOR HYDRAULIC/AIR-PRESSURE EQUIPMENT AND METHOD THEREOF

[75] Inventor: Myung-Hoon Song, Kyungki, Rep. of Korea

[73] Assignee: Samsung Heavy Industry Co., Ltd., Rep. of Korea

[21] Appl. No.: 326,329

[22] Filed: Oct. 20, 1994

[30] Foreign Application Priority Data

Mar. 31, 1994 [KR] Rep. of Korea .................... 1994-6729

[51] Int. Cl.[6] ........................................ G05B 7/04

[52] U.S. Cl. ................................ 364/424.05; 364/424.07

[58] Field of Search ......................... 364/424.05, 424.07, 364/561, 562, 572

[56] References Cited

U.S. PATENT DOCUMENTS 4,509,000 4/1985 Ferguson ................................ 318/591
5,320,186 6/1994 Strosser et al. ............................ 172/8
5,359,836 11/1994 Zeuner et al. ...................... 56/10.2 E

*Primary Examiner*—Michael Zanelli
*Attorney, Agent, or Firm*—Lieberman & Nowak

[57] ABSTRACT

Disclosed is a shock prevention apparatus and method for hydraulic construction equipment such as excavators, loaders, dozers and cranes, which use hydraulic cylinders and motors as actuators. The shock prevention apparatus of the present invention low pass filters an original actuator driving command signal of the rectangular wave in accordance with displacement data of the piston stroke in the actuator, to generate a smooth actuator driving command signal, so that the shocks due to rapid opening and closing of the oil passages of the hydraulic actuator and the shocks at the stroke ends of the piston of the hydraulic actuator are prevented.

7 Claims, 7 Drawing Sheets

SHOCK PREVENTION APPARATUS FOR HYDRAULIC/AIR-PRESSURE EQUIPMENT AND METHOD THEREOF

BACKGROUND OF THE INVENTION

The present invention relates to a shock prevention apparatus and method for hydraulic/air-pressure equipment such as construction equipment including excavators, loaders, bulldozers and cranes, which use hydraulic/air-pressure cylinders and motors as actuators.

In general, construction equipment such as excavators, loaders, bulldozers and cranes used at construction sites, are equipment performing mechanical works using hydraulic/air-pressure force. Such construction equipment may cause shocks due to the abrupt opening and closing of oil/air passages when the hydraulic actuator starts or stops quickly. The shocks would unavoidably lower the durability and reduce the expected life span of the construction equipment.

Further, these shocks are delivered to the equipment's body and cause violent vibrations, thus reducing the work efficiency of the driver.

Conventionally, in order to prevent or reduce the severity of the shock, a shockless valve or an orifice is employed in the hydraulic/air-pressure circuits. However, it is known that the effect of this shockless valve or the orifice is insufficient, and the design and the control thereof are troublesome.

In addition, in order to prevent the shocks at the stroke ends of the piston of the actuator (for example, a hydraulic cylinder), a mechanical cushion device has been installed at the ends of the piston of the hydraulic cylinder. However, there was a problem in that precision mechanical manufacturing was demanded and that the device could become damaged or destroyed due to the friction or the shocks of the cushion device itself.

Accordingly, there is a strong demand for an effective and essential solution for preventing shock in hydraulic/air-pressure equipment.

SUMMARY OF THE INVENTION

It is therefore an object of the present invention to provide hydraulic/air-pressure equipment wherein shocks at stroke ends of piston in a hydraulic/air-pressure actuator due to rapid opening and closing of the oil/air passage are prevented, improving the durability and the expected life span of the equipment and guaranteeing a comfortable working environment.

It is another object of the present invention to provide a method for effectively preventing shocks in hydraulic/air-pressure equipment.

According to one aspect of the present invention, there is provided a shock prevention apparatus for equipment having a hydraulic/air-pressure actuator performing mechanical works by hydraulic/air pressure and a valve for controlling the flow of oil/air to the actuator, including means for receiving an original actuator driving command signal and data associated with the displacement of a piston of the actuator and generating a low-pass-filtered actuator driving command signal, whereby controlling the valve in accordance with the low-pass-filtered actuator driving command signal.

According to another aspect of the present invention, there is provided a shock prevention method for preventing shocks of a hydraulic/air-pressure actuator using a controller, including the steps of a) providing the controller with displacement data of piston stroke of the hydraulic/air-pressure actuator; b) providing the controller with an original actuator driving command signal; c) generating a low-pass-filtered actuator driving command signal in accordance with the displacement data and the original actuator driving command signal; and returning to first step.

Further, the present invention includes, between step (b) and step (c), a step for establishing a shock prevention interval of the hydraulic/air-pressure actuator by performing a functional operation with respect to the original actuator driving command signal.

BRIEF DESCRIPTION OF THE DRAWINGS

These and other objects, features, and advantages of the present invention are better understood by reading the following detailed description of the invention, taken in conjunction with the accompanying drawings, wherein.

DETAILED DESCRIPTION OF THE PREFERRED EMBODIMENTS

In the following descriptions, a preferred embodiment of the present invention will be explained in connection with hydraulic equipment by way of example for the convenience of explanation would be; however, obvious to a person skilled in the art that the present invention may be readily applied to air-pressure equipment and in that case, the respective elements in the hydraulic equipment to be explained in the following would be simply replaced with the equivalent elements implementing the same functions.

Figure 1:
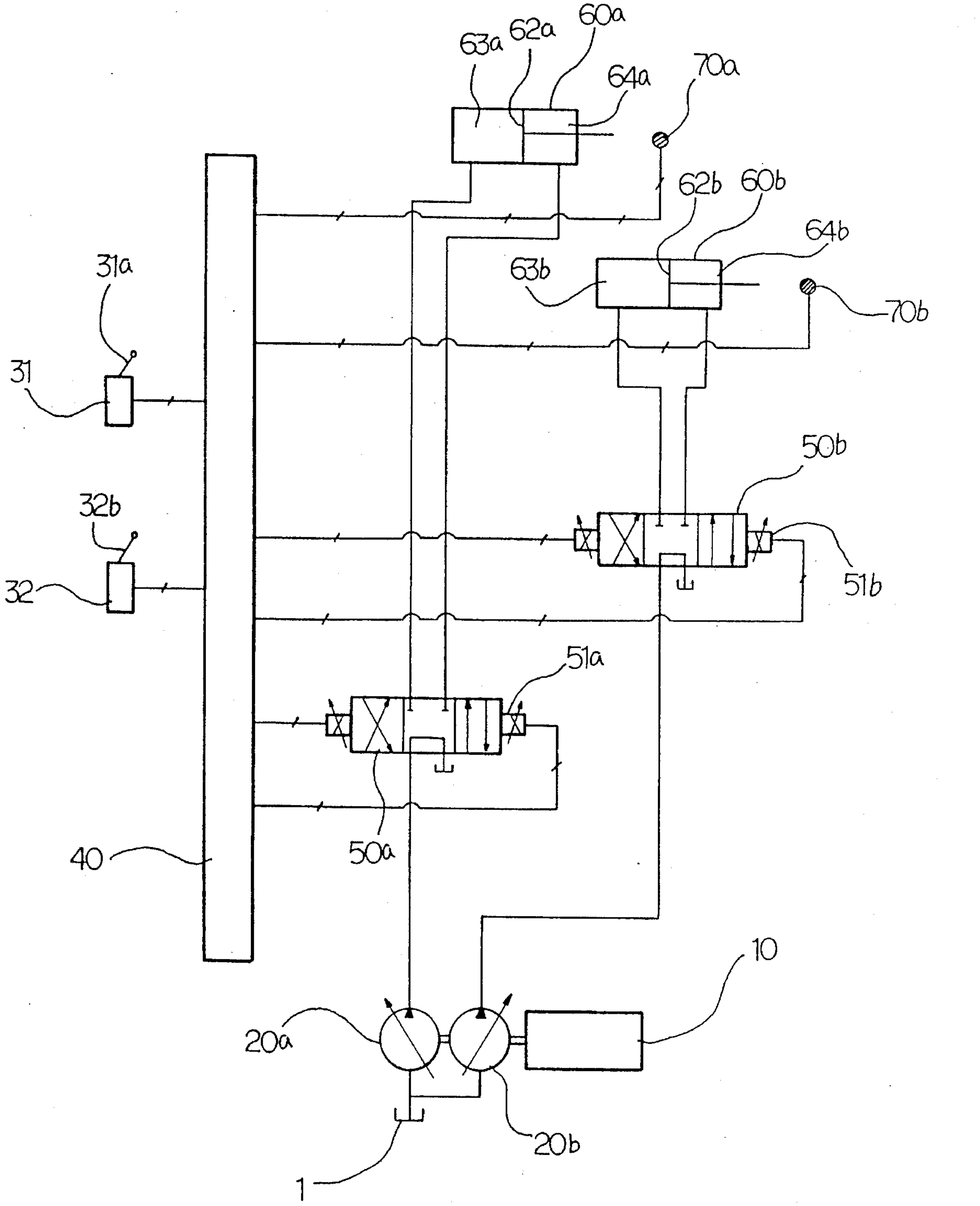
FIG. 1 is a schematic diagram showing the overall structure of a hydraulic system to which a shock prevention apparatus according to the present invention is applied.

Referring to FIG. 1, variable displacement pumps **20*a* and 20*b* driven by an engine 10 provide hydraulic cylinders 60*a* and 60*b* with an appropriate amount of oil supplied from an oil tank 1. The solenoid controlled proportional valves 50*a* and 50*b*, each being controlled by a controller 40, are installed at oil passages formed between the pumps 20*a* and 20*b* and the cylinders 60*a* and 60*b*. The controller 40 includes a microcomputer containing a program according to the working conditions, to perform an arithmetic operation for the actuator driving command signals received from input units 31 and 32 each having control levers 31*a* and 32*b* and the displacement data associated with positions of pistons 62*a* and 62*b* detected by displacement detectors 70*a* and 70*b*, so as to control the valves 50*a* and 50*b***.

Detailed descriptions for the program performed by the microcomputer will be presented later.

The respective control valves 50*a* and 50*b* open and close oil passages extended to large chambers 63*a* and 63*b* and small chambers 64*a* and 64*b* of the hydraulic cylinders 60*a* and 60*b*, in dependence upon the movements of spools 51*a* and 51*b* each being controlled by the controller 40, so as to cause the pistons 62*a* and 62*b* of the hydraulic cylinders 60*a* and 60*b* to reciprocate. In FIG. 1, two solenoid controlled proportional valves and two hydraulic cylinders are described. However, it should be noted that the number of those elements may be increased.

Meanwhile, according to the present invention, in cases where the actuator driving command signals received from the input units 31 and 32 and applied to the controller 40 are rectangular pulses, a transform means for transforming the actuator driving command signals of the rectangular pulses to a smooth actuator driving command signals is provided to either the input units 31 and 32, the controller 40, or a position between the input units 31 and 32 and the controller 40, in order to prevent the shocks which may be caused by a quick driving of the control valves 50*a* and 50*b*. In this embodiment, a low-pass filter is used for the transform means.

Figure 2:
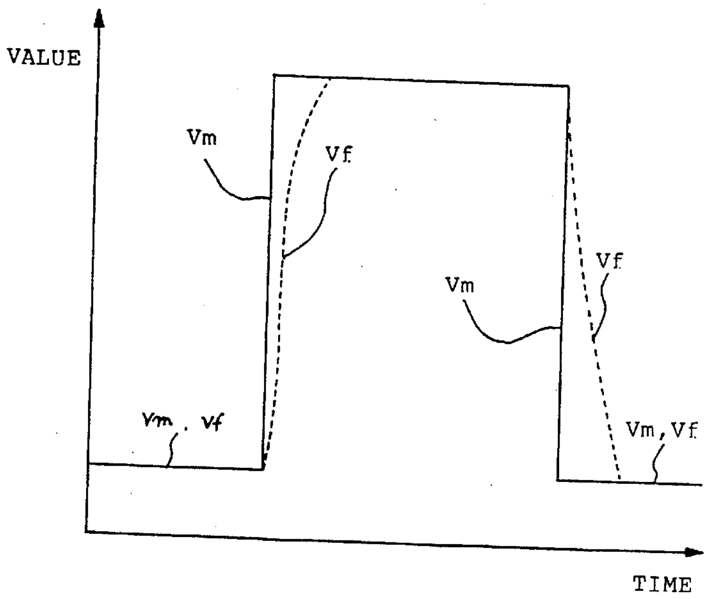
FIG. 2 shows curves of an original actuator driving command signal and an actuator driving command signal obtained by low-pass-filtering the original actuator driving command signal.

Referring to FIG. 2, after low-pass-filtering, the rectangular original actuator driving command signal Vm is transformed to a smooth actuator driving command signal Vf of which the edges are smoothed.

Accordingly, even if the original actuator driving command signal Vm transits sharply, since the solenoid controlled proportional valves 50*a* and 50*b* are controlled by the low-pass-filtered smooth actuator driving command signal Vf, the oil passages of the hydraulic cylinders 60*a* and 60*b* are not quickly opened and closed, thereby avoiding the shocks of the hydraulic cylinder as well as the shocks delivered to the overall equipment.

Figure 3:
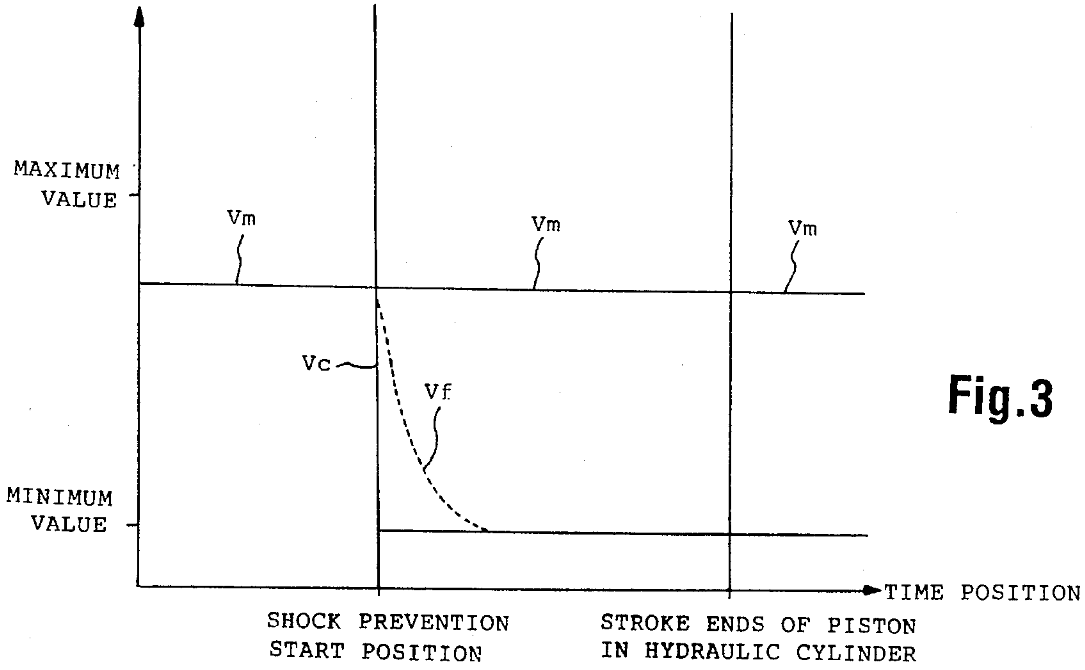
FIG. 3 shows curves of the actuator driving command signals for implementing a stable shock prevention operation.

Meanwhile, referring to FIG. 3, even if the original actuator driving command signals Vm is applied so as to have the piston continue to advance to the stroke ends of the piston over a time t0 at which the shock prevention operation is started at the shock prevention start position around the stroke ends of the piston in the hydraulic cylinder, a shock prevention signal Vc is low-pass-filtered to generate the smooth actuator driving command signal Vf by using the program contained in the controller 40.

Here, the shock prevention signal Vc is the same as the minimum value of the original actuator driving command signal Vm. Namely, even if the original actuator driving command signal Vm at the stroke ends of the piston has a magnitude and a direction which may cause mechanical shocks, the original actuator driving command signal is transformed to the smooth actuator driving command signal Vf, so as to prevent the shocks.

The shock prevention start position is established at a fixed absolute displacement value where the hydraulic cylinder advances with the minimum speed corresponding to the minimum actuator driving command signal, in response to the low-pass-filtered smooth actuator driving command signal.

Meanwhile, a preferred embodiment for the low-pass filter may be performed with the low-pass filtering algorithm, by using the program contained in the controller 40.

Figure 4:
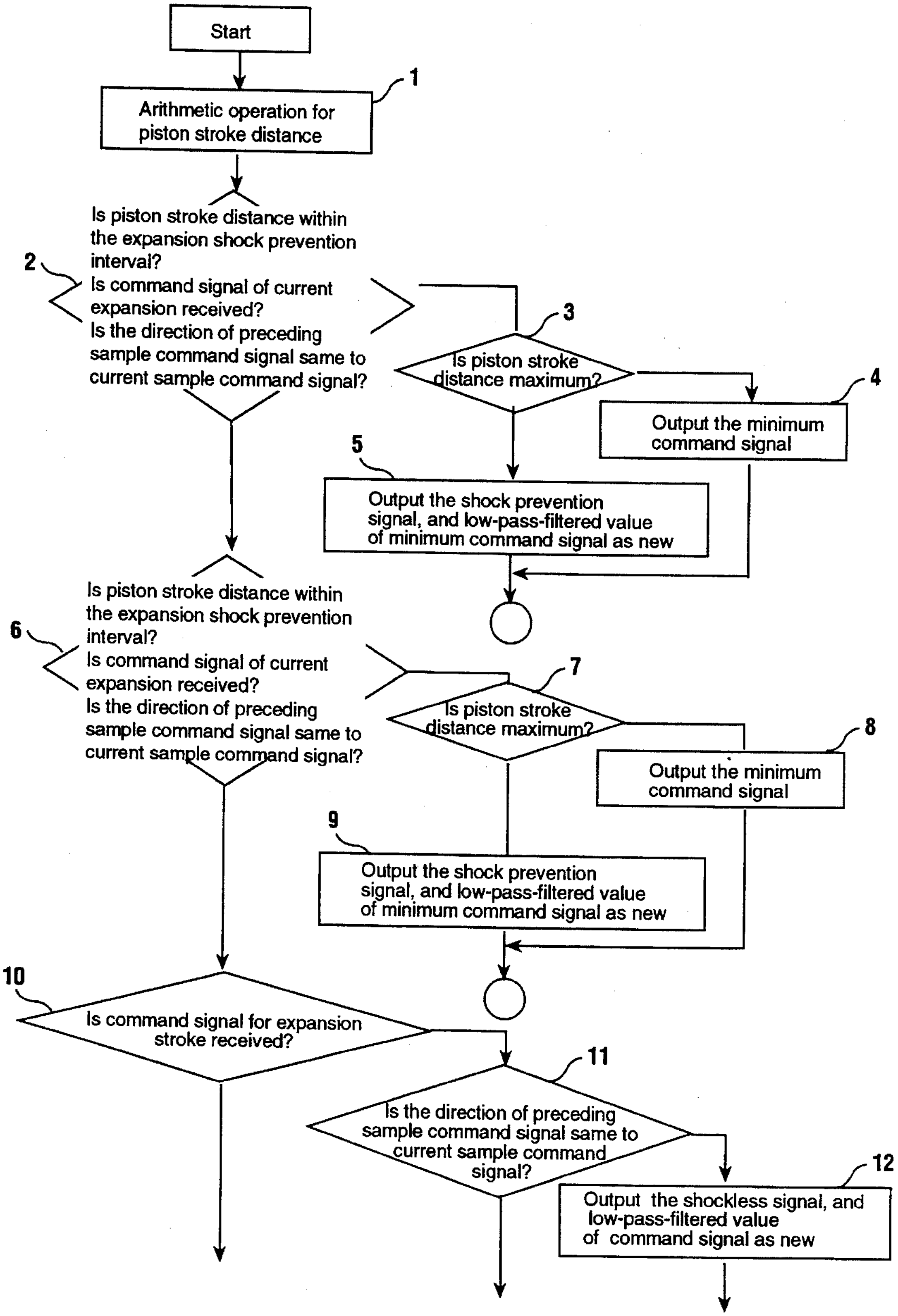
FIGS. 4A and 4B show a flow chart illustrating a processing program of the controller of FIG. 1 for preventing the shocks according to the present invention.
Figure 4B:
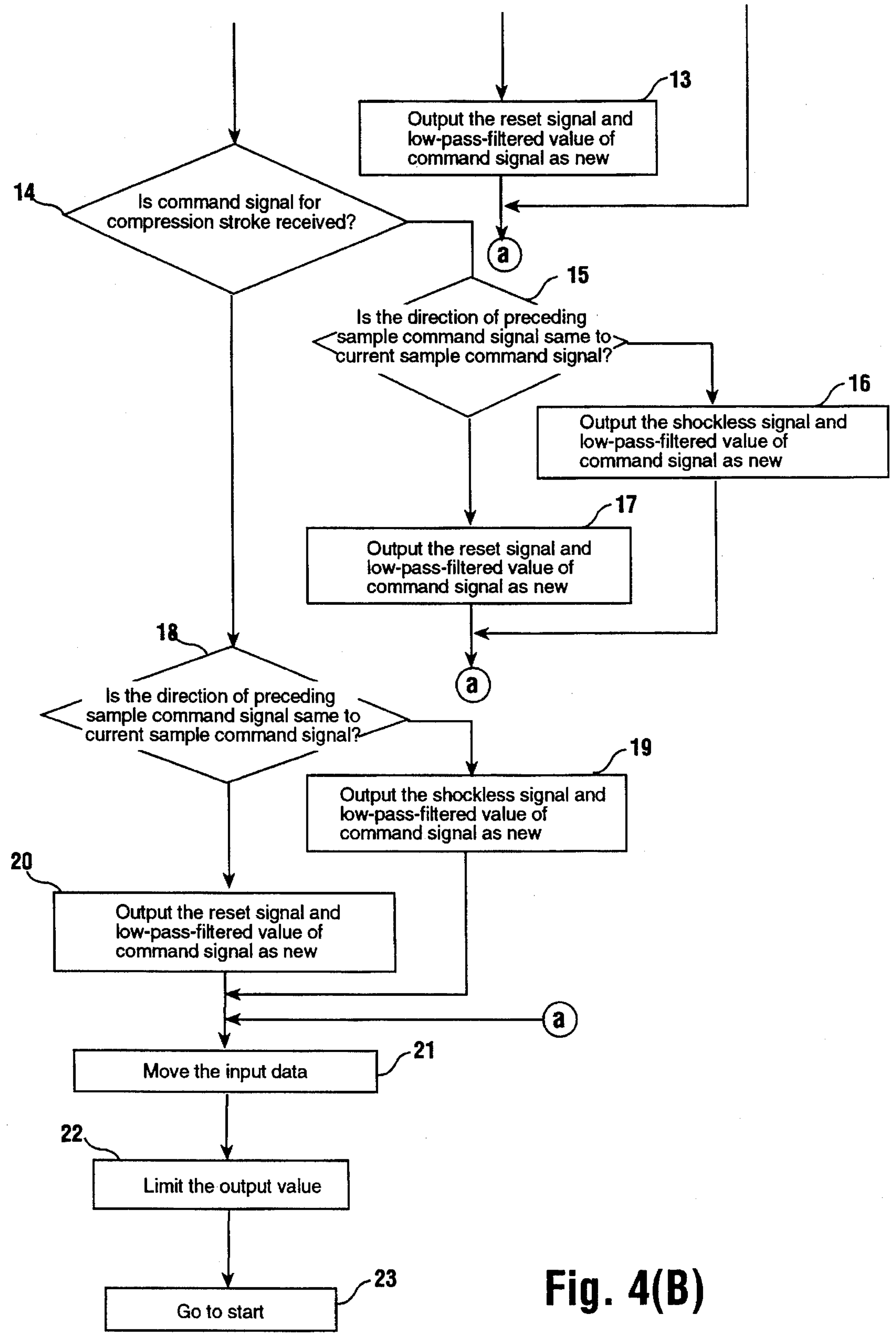

FIGS. 4A and 4B show flow charts of the program contained in the microcomputer for performing the low-pass filtering algorithm.

In step 4-1, displacement data output from the displacement detectors 70*a* and 70*b* are received and a piston stroke distance is calculated from the displacement data through a predetermined arithmetic operation.

In step 4-2, it is judged whether the piston is positioned within a shock prevention interval of an expansion stroke thereof, whether an actuator driving command signal for the expansion stroke is currently received, and whether or not the actuator driving command signal of the preceding sample and the actuator driving command signal of the current sample are both being applied for the same expansion stroke.

In step 4-3, if the conditions of step 4-3 are satisfied, it is judged whether the current piston stroke distance is the maximum.

In step 4-4, if the conditions of step 4-3 are satisfied, the minimum actuator driving command signal for the expansion stroke is determined as a new actuator driving command signal, then advancing to next step "a".

In step 4-5, if the condition of step 4-3 is not satisfied, i.e., if the piston is positioned within a shock prevention interval of the expansion stroke thereof, an actuator driving command signal for the expansion stroke is currently received, an actuator driving command signal of the preceding sample and an actuator driving command signal of the current sample are both for the same expansion stroke, and the piston does not reach the stroke end of the expansion stroke, then a shock prevention signal is generated and a low-pass-filtered value of a minimum actuator driving command signal is determined as a new actuator driving command signal, thereafter advancing to the next step "a".

In step 4-6, it is judged whether the piston is positioned within the shock prevention interval of the compression stroke thereof, an actuator driving command signal for the compression stroke is currently received, and whether or not the actuator driving command signal of the preceding sample and the actuator driving command signal of the current sample are both being applied for the same compression stroke.

In step 4-7, if the condition of the step 4-6 is satisfied, it is judged whether the current piston stroke distance is the maximum.

In step 4-8, if the condition of the step 4-7 is satisfied, the minimum actuator driving command signal for the compression stroke is determined as a new actuator driving command signal, then advancing to the next step "a".

In step 4-9, if the condition of step 4-7 is not satisfied, i.e., if the piston is positioned within a shock prevention interval of a compression stroke thereof, an actuator driving command signal for the compression stroke is currently received, an actuator driving command signal of the preceding sample and an actuator driving command signal of the current sample are both for the same compression stroke, and the piston does not reach the stroke end of the compression stroke, then a shock prevention signal is generated and a low-pass-filtered value of the minimum actuator driving command signal is determined as a new actuator driving command signal, thereafter advancing to the next step "a".

In step 4-10, if all the conditions of steps 4-2 and 4-6 are not satisfied, i.e., if the piston is not positioned within the shock prevention interval, an actuator driving command signal for the compression stroke is currently received within the shock prevention interval of the expansion stroke, and an actuator driving command signal for the expansion stroke is received within the shock prevention interval of the compression stroke, it is judged whether or not the actuator driving command signal for the expansion stroke was received.

In step 4-11, if the conditions of step 4-10 are satisfied, it is judged whether or not the actuator driving command signal of the preceding sample and the actuator driving command signal of the current sample are both being applied for the same stroke.

In step 4-12, if the conditions of step 4-11 are satisfied, a shockless signal is generated and a low-pass-filtered value of the actuator driving command signal is determined as a new actuator driving command signal, thereafter advancing to the next step "a".

In step 4-13, if the conditions of step 4-11 are not satisfied, i.e., if an actuator driving command signal instructing a reverse of the piston stroke is received, a reset signal is generated and a low-pass-filtered signal of the actuator driving command signal is determined as a new actuator driving command signal, thereafter advancing to the next step "a".

In step 4-14, if the conditions of step 4-10 are not satisfied, it is judged whether or not the actuator driving command signal for the compression stroke was received.

In step 4-15, if the conditions of step 4-14 are satisfied, it is judged whether the actuator driving command signal of the preceding sample and the actuator driving command signal of the current sample are both being applied for the same stroke.

In step 4-16, if the conditions of step 4-15 are satisfied, the shockless signal is generated and the low-pass-filtered value of the actuator driving command signal is determined as the new actuator driving command signal, thereafter advancing to the next step "a".

In step 4-17, if the condition of step 4-15 are not satisfied, i.e., the actuator driving command signal instructing the reverse of the piston stroke is received, the reset signal is generated and the low-pass-filtered value of the actuator driving command signal is determined as the new actuator driving command signal, thereafter advancing to the next step "a".

In step 4-18, if all the conditions of steps 4-2, 4-6, 4-10 and 4-14 are not satisfied, i.e., for example, in cases where the actuator driving command signal is in a neutral state, it is judged whether the actuator driving command signal of the preceding sample and the actuator driving command signal of the current sample are both being applied for the same stroke.

In step 4-19, if the conditions of step 4-18 are satisfied, a shockless signal is generated and the low-pass-filtered value of the actuator driving command signal is determined as the new actuator driving command signal, thereafter advancing to the next step "a".

In step 4-20, if the conditions of step 4-18 are not satisfied, i.e., if the actuator driving command signal instructing the reverse of the piston stroke is received, the reset signal is generated and the low-pass-filtered signal of the actuator driving command signal is determined as the new actuator driving command signal.

In step 4-21, the actuator driving command signal of the current sample is substituted for the actuator driving command signal of the preceding sample, so as to increase the sampling time.

In step 4-22, the low-pass-filtered actuator driving command signal is limited to an interval between the maximum value and the miminum value of the actuator driving command signal available in practice.

In step 4-23, the program returns to the start point to form an endless loop.

Figure 6A:
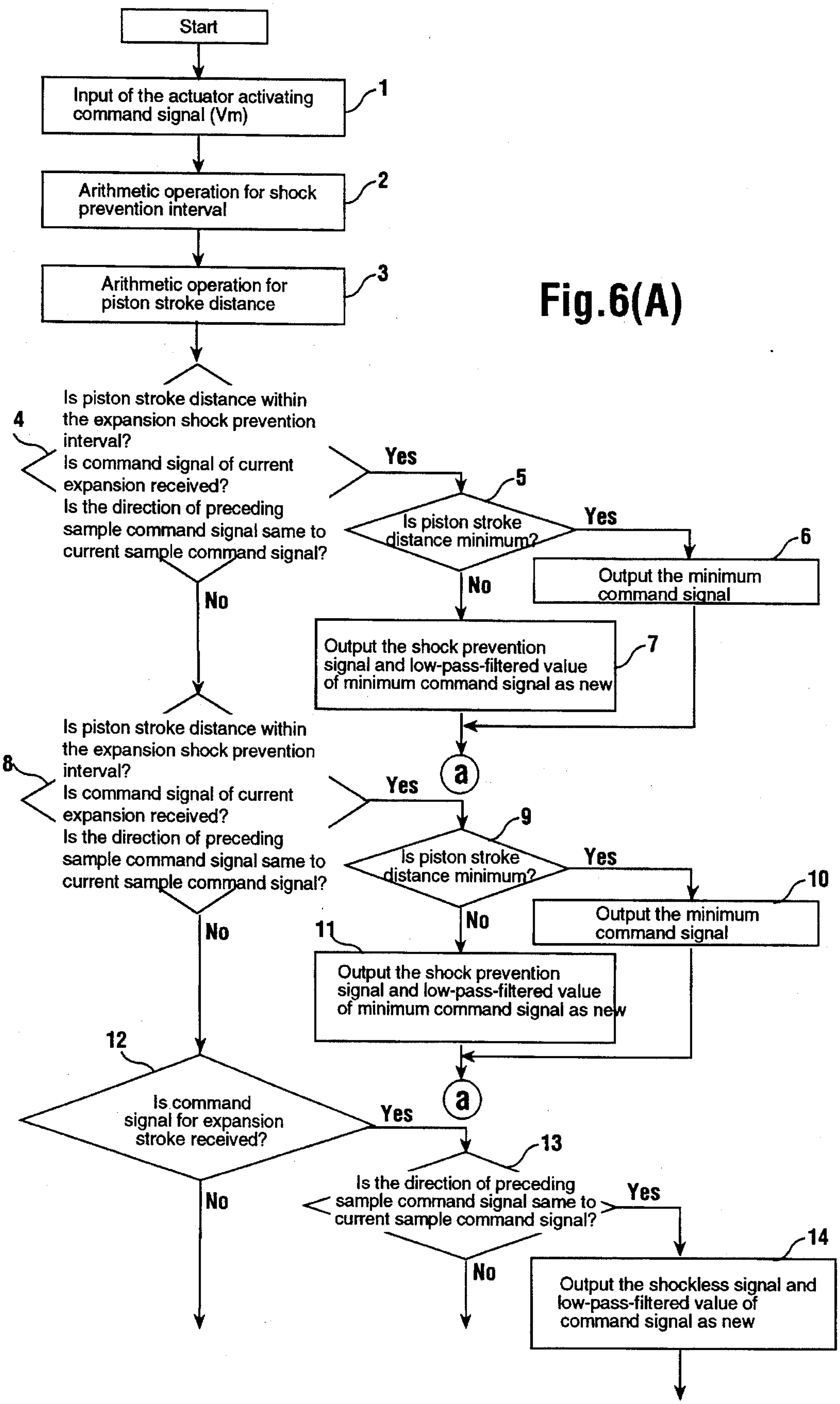
FIGS. 6A and 6B show a flow chart illustrating another processing program of the controller of FIG. 1 for preventing the shocks according to the present invention.
Figure 6B:
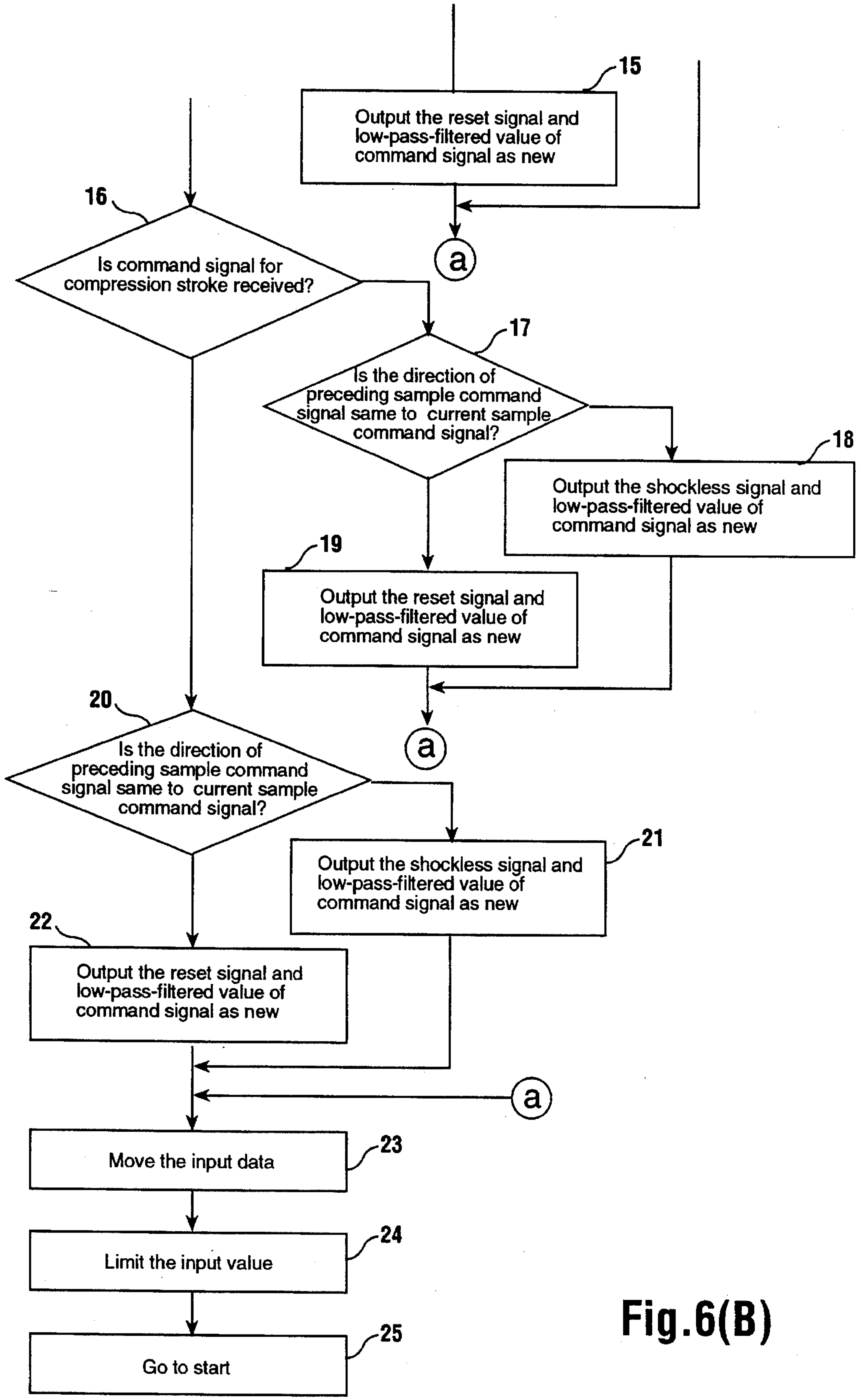

FIGS. 6A and 6B show another embodiment of the low-pass-filtering algorithm.

In step 6-1, the original actuator driving command signal is received from the input units 30*a* and 30*b* of FIG. 1.

Figure 5:
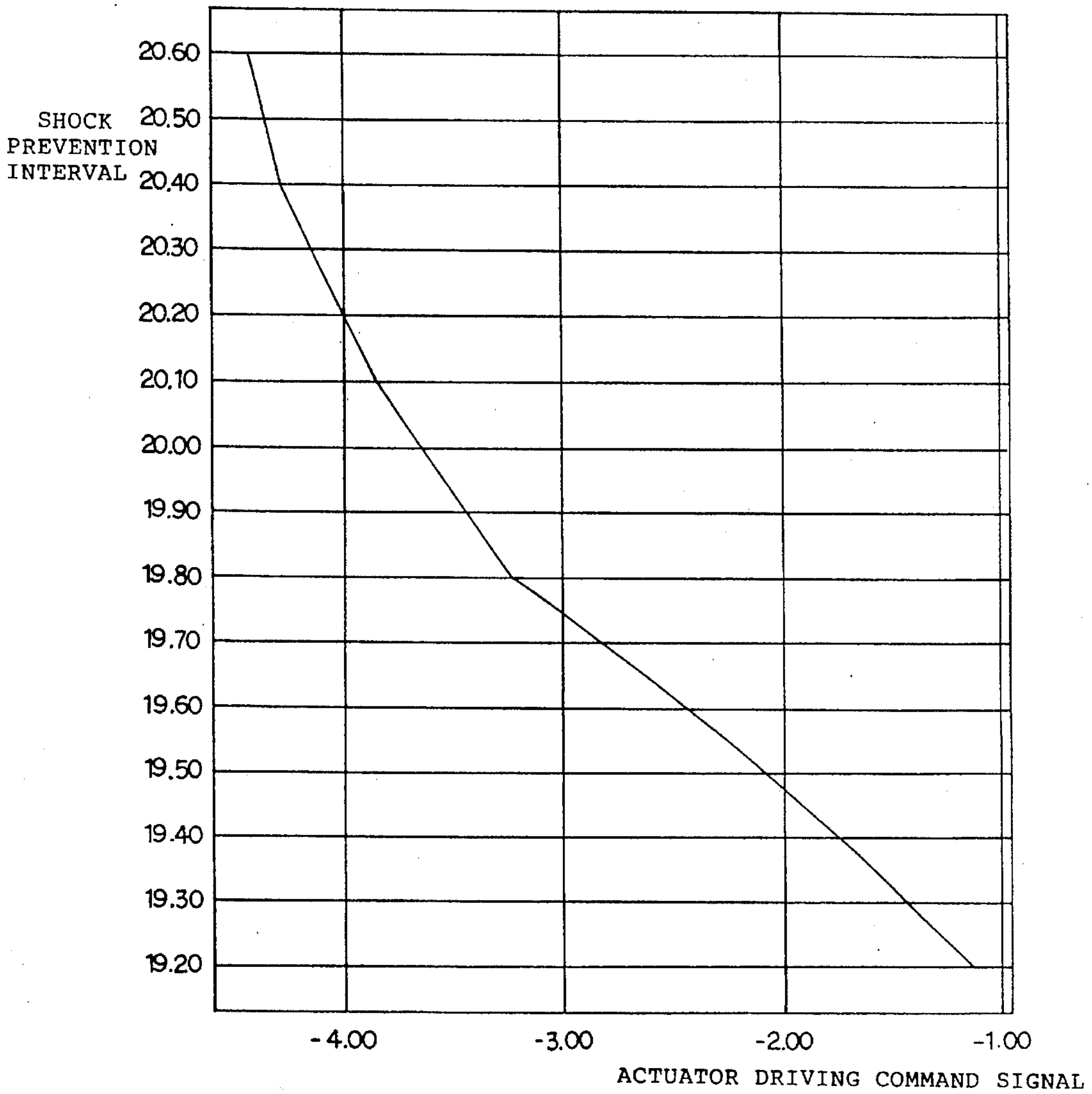
FIG. 5 is a graph showing a change of the shock prevention interval in accordance with the actuator driving command signal.

In step 6-2, a shock prevention interval D is established by performing a functional operation using the original driving signal received at step 6-1 as a parameter such that a functional relation between the original driving command signal, and the shock prevention interval becomes as shown in graph of FIG. 5.

In step 6-3, displacement data of the actuator is received from the displacement detectors 70*a* and 70*b* of FIG. 1, and the piston stroke distance of the hydraulic cylinder by performing an arithmetic operation using the received displacement data.

In step 6-4, it is judged whether the piston is positioned within the shock prevention interval of the expansion stroke, whether an actuator driving command signal for the expansion stroke of the piston is currently received, and whether or not the actuator driving command signal of the preceding sample and the actuator driving command signal of the current sample are both being applied for the same stroke.

In step 6-5, if the conditions of step 6-4 are satisfied, it is judged whether or not the current piston stroke distance is the maximum value.

In step 6-6, if the condition of step 6-5 is satisfied, the minimum actuator driving command signal of the expansion stroke is determined as a new actuator driving command signal, thereafter advancing to a next step "b".

In step 6-7, if the condition of step 6-5 is not satisfied, i.e., if the piston is positioned within a shock prevention interval of an expansion stroke thereof, an actuator driving command signal for the expansion stroke is currently received, an actuator driving command signal of the preceding sample and an actuator driving command signal of the current sample are both applied for the same expansion stroke, and the piston does not get reach the stroke end of the expansion stroke, then a shock prevention signal is generated and a low-pass-filtered value of a minimum actuator driving command signal is determined as a new actuator driving command signal, thereafter advancing to the next step "b".

In step 6-8, it is judged whether the piston is positioned within the shock prevention interval of the compression stroke thereof, whether an actuator driving command signal for the compression stroke is currently received, and whether or not the actuator driving command signal of the preceding sample and the actuator driving command signal of the current sample are both being applied for the same stroke.

In step 6-9, if the conditions of step 6-8 are satisfied, it is judged whether or not the current piston stroke distance is the minimum value.

In step 6-10, if the conditions of step 6-9 are satisfied, the minimum actuator driving command signal of the compression stroke is determined as the new actuator driving command signal, thereafter advancing to the next step "b".

In step 6-11, if the conditions of step 6-9 are not satisfied, i.e., if the piston is positioned within a shock prevention interval of the compression stroke thereof, an actuator driving command signal for the compression stroke is currently received, an actuator driving command signal of the preceding sample and an actuator driving command signal of the current sample are both applied for the same compression stroke, and the piston does not yet reach the stroke end of the compression stroke, then a shock prevention signal is generated and a low-pass-filtered value of the minimum actuator driving command signal is determined as a new actuator driving command signal, thereafter advancing to the next step "b".

In step 6-12, if all the conditions of steps 6-4 and 6-8 are not satisfied, i.e., if the piston is not positioned within the shock prevention interval, an actuator driving command signal for the compression stroke within the shock prevention interval of the expansion stroke is received, or an actuator driving command signal for the expansion stroke within the shock prevention interval of the compression stroke is received, it is judged whether or not an actuator driving command signal for the expansion stroke is received.

In step 6-13, if the conditions of step 6-12 are satisfied, it is judged whether the actuator driving command signal of the preceding sample and the actuator driving command signal of the current sample are both being applied for the same stroke.

In step 6-14, if the conditions of step 6-13 are satisfied, the shockless signal is generated and the low-pass-filtered value of the actuator driving command signal is determined as a new actuator driving command signal, thereafter advancing to the next step "b".

In step 6-15, if the conditions of step 6-13 are not satisfied, i.e., if the actuator driving command signal instructing the reverse of the piston stroke is received, the reset signal is generated and the low-pass-filtered signal of the actuator driving command signal is determined as a new actuator driving command signal, thereafter advancing to the next step "b".

In step 6-16, if the conditions of step 6-12 are not satisfied, it is judged whether or not the actuator driving command signal for the compression stroke is received.

In step 6-17, if the conditions of step 6-16 are satisfied, it is judged whether the actuator driving command signal for the preceding sample and the actuator driving command signal for the current sample are both being applied for the same stroke.

In step 6-18, if the conditions of step 6-17 are satisfied, the shockless signal is generated and the low-pass-filtered value of the actuator driving command signal is determined as the a new actuator driving command signal, thereafter advancing to the next step "b".

In step 6-19, if the conditions of step 6-17 are not satisfied, i.e., if the actuator driving command signal instructing the reverse of the piston stroke is received, the reset signal is generated and the low-pass-filtered signal of the actuator driving command signal is determined as a new actuator driving command signal, thereafter advancing to the next step "b".

In step 6-20, if all the conditions of steps 6-4, 6-8, 6-12 and 6-16 are not satisfied, i.e., in cases where, for example, the actuator driving command signal is in a neutral state, it is judged whether the actuator driving command signal of the preceding sample and the actuator driving command signal of the current sample are both being applied for the same stroke.

In step 6-21, if the conditions of step 6-20 are satisfied, the shockless signal is generated and the low-pass-filtered value of the actuator driving command signal is determined as the a new actuator driving command signal, thereafter advancing to the next step "b".

In step 6-22, if the conditions of step 6-20 are not satisfied, i.e., if the actuator driving command signal instructing the reverse of the piston stroke is received, the reset signal is generated and the low-pass-filtered signal of the actuator driving command signal is determined as a new actuator driving command signal.

In step 6-23, the driving command signal of the current sample is substituted by the actuator driving command signal of the preceding sample, so as to increase the sampling time.

In step 6-24, the low-pass-filtered actuator driving command signal is limited to an interval between the maximum value and the minimum value of the actuator driving command signal available in practice.

In step 6-25, the program returns to the start point to form an endless loop.

In the embodiment mentioned above, the program contained in the microcomputer of the controller performs the low-pass filtering operation for the rectangular wave of the original actuator driving command signal, to generate the smooth wave of the actuator driving command signal. The hydraulic actuator is controlled by the smooth actuator driving command signal, so that the shocks due to rapid opening and closing of the oil passages and the shocks at the stroke ends of the piston of the hydraulic actuator may be prevented.

Furthermore, the efficiency of the shock prevention may be optimized by adjusting the bandwidth of the low-pass filter.

As described above, the present invention effectively prevents shocks due to rapid opening and closing of the oil passages of the hydraulic actuator and the shocks at the stroke ends of the piston of the hydraulic actuator as well as the vibration caused by the shocks. Therefore, the durability and the expected life span of the equipment may be improved and a comfortable working environment may be guaranteed.

What is claimed is:

1. A shock prevention apparatus for equipment having at least one hydraulic/air pressure actuator performing mechanical work by hydraulic/air pressure and at least one valve for controlling the flow of oil/air to said actuator, comprising:

at least one input means for generating an original actuator driving command signal; and controller means for receiving said original actuator driving command signal and data associated with the displacement of a piston of said actuator and said controller means generating a low-pass-filtered actuator driving command signal from said original actuator driving command signal and said data associated with the piston displacement of said actuator to control said valve by means of the low-pass-filtered actuator driving command signal.

2. The shock prevention apparatus as claimed in claim 1, wherein said controller means transforms said original driving command signal received from said input means in the form of a rectangular wave into said low pass filtered actuator driving command in the form of a smooth wave.

3. The shock prevention apparatus as claimed in claim 1, wherein said controller means enables/disables said means for generating said low-pass-filtered actuator driving command signal in accordance with said piston displacement data.

4. The shock prevention apparatus as claimed in claim 1, wherein said input means are manually controlled.

5. A shock prevention method for preventing shocks of a hydraulic/air pressure actuator using a controller comprising the steps of:

(a) providing said controller with displacement data of the piston stroke of said hydraulic/air pressure actuator;

(b) providing said controller with an original actuator driving command signal;

(c) generating a low-pass-filtered actuating driving command signal in accordance with said displacement data and said original actuator driving command signal;

(d) applying said low-pass-filtered actuating driving command signal to said hydraulic/air pressure actuator to actuate same; and (e) returning to step (a).

6. The shock prevention method as claimed in claim 5, further comprising, between said step (b) and said step (c), a step of deriving a shock prevention interval of said hydraulic/air-pressure actuator from said original actuator driving command signal as a parameter.

7. The shock prevention method as claimed in claim 5 or claim 6, wherein said step (c) comprises:

a first step of calculating a piston stroke distance in accordance with said displacement data of the piston;

a second step of judging whether the piston is positioned within a shock prevention interval of an expansion stroke thereof, an actuator driving command signal in the expansion stroke is currently received, and whether or not the actuator driving command signal of the preceding sample and the actuator driving command signal of the current sample are both applied for the same expansion stroke;

a third step of, if the condition of the second step is satisfied, judging whether the current piston stroke distance is the maximum;

a fourth step of, if the condition of the third step is satisfied, determining a minimum actuator driving command signal for the expansion stroke as a new actuator driving command signal;

a fifth step of, if the condition of the third step is not satisfied, generating a shock prevention signal and determining a low-pass-filtered value of a minimum actuator driving command signal as a new actuator driving command signal;

a sixth step of judging whether the piston is positioned within the shock prevention interval of the compression stroke thereof, an actuator driving command signal for the compression stroke is currently received, and whether or not the actuator driving command signal of the preceding sample and an actuator driving command signal of the current sample are both applied for the same compression stroke;

a seventh step of, if the condition of the sixth step is satisfied, judging whether the current piston stroke distance is the maximum;

an eighth step of, if the condition of the seventh step is satisfied, determining the minimum actuator driving command signal for the compression stroke as a new actuator driving command signal;

a ninth step of, if the condition of the seventh step is not satisfied, generating a shock prevention signal and determining a low-pass-filtered value of the minimum actuator driving command signal as a new actuator driving command signal;

a tenth step of, if all the conditions of the second and sixth steps are not satisfied, judging whether the actuator driving command signal for the expansion stroke is received or not;

an eleventh step of, if the condition of the tenth step is satisfied, judging whether the actuator driving command signal of the preceding sample and the actuator driving command signal of the current sample are both applied for the same stroke or not;

a twelfth step of, if the condition of the eleventh step is satisfied, generating a shockless signal and determining a low-pass-filtered value of the actuator driving command signal as a new actuator driving command signal;

a thirteenth step of, if the condition of the eleventh step is not satisfied, generating a reset signal and determining a low-pass-filtered signal of the actuator driving command signal as a new actuator driving command signal;

a fourteenth step of, if the condition of the tenth step is not satisfied, judging whether the actuator driving command signal for the compression stroke is received or not;

a fifteenth step of, if the condition of the fourteenth step is satisfied, judging whether the actuator driving command signal of the preceding sample and the actuator driving command signal of the current sample are both applied for the same stroke;

a sixteenth step of, if the condition of the fifteenth step is satisfied, generating the shockless signal and determining the low-pass-filtered value of the actuator driving command signal as the new actuator driving command signal;

a seventeenth step of, if the condition of the fifteenth step is not satisfied, generating the reset signal and determining the low-pass-filtered value of the actuator driving command signal as the new actuator driving command signal;

an eighteenth step of, if all the conditions of the second, sixth, tenth and fourteenth steps are not satisfied, judging whether the actuator driving command signal of the preceding sample and the actuator driving command signal of the current sample are both applied for the same stroke;

a nineteenth step of, if the condition of the eighteenth step is satisfied, generating the shockless signal and determining the low-pass-filtered value of the actuator driving command signal as the new actuator driving command signal;

a twentieth step of, if the condition of the eighteenth step is not satisfied, generating the reset signal and determining the low-pass-filtered signal of the actuator driving command signal as the new actuator driving command signal;

a twenty-first step of substituting the actuator driving command signal of the current sample by the actuator driving command signal of the preceding sample, so as to increase the sampling time; and a twenty-second step of limiting the low-pass-filtered actuator driving command signal to an interval between the maximum value and the minimum value of the actuator driving command signal.

* * * * *